(12) United States Patent
Feist et al.

(10) Patent No.: US 11,403,428 B2
(45) Date of Patent: Aug. 2, 2022

(54) PROTECTING INTEGRITY OF LOG DATA

(71) Applicant: Siemens Aktiengesellschaft, Munich (DE)

(72) Inventors: Christian Peter Feist, Munich (DE); Tolga Sel, Munich (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 232 days.

(21) Appl. No.: 16/743,056

(22) Filed: Jan. 15, 2020

(65) Prior Publication Data
US 2020/0226292 A1    Jul. 16, 2020

(30) Foreign Application Priority Data

Jan. 16, 2019    (EP) ..................................... 19152043

(51) Int. Cl.
*G06F 21/64*    (2013.01)
*G06F 16/23*    (2019.01)
*G06F 21/60*    (2013.01)

(52) U.S. Cl.
CPC .......... *G06F 21/64* (2013.01); *G06F 16/2379* (2019.01); *G06F 21/602* (2013.01)

(58) Field of Classification Search
CPC .......... G06F 21/60; G06F 21/62; G06F 21/64; G06F 21/645; G06F 16/2379; G06F 21/602; H04L 63/12
See application file for complete search history.

(56) References Cited

U.S. PATENT DOCUMENTS

| | | | |
|---|---|---|---|
| 10,460,130 B1* | 10/2019 | Chhabra | ............... H04L 9/3247 |
| 2004/0078576 A1 | 4/2004 | Geitinger | |
| 2007/0271592 A1 | 11/2007 | Noda et al. | |
| 2011/0145578 A1 | 6/2011 | Asano et al. | |
| 2012/0017093 A1 | 1/2012 | Savitzky et al. | |
| 2015/0188715 A1* | 7/2015 | Castellucci | ........... H04L 9/3297 |
| | | | 713/178 |
| 2018/0144125 A1 | 5/2018 | Frank | |

(Continued)

FOREIGN PATENT DOCUMENTS

| | | |
|---|---|---|
| JP | 2007310579 A | 11/2007 |
| JP | 2008206158 A | 9/2008 |
| JP | 2011130012 A | 6/2011 |

(Continued)

OTHER PUBLICATIONS

Office Action in corresponding Korean Patent Application No. 10-2020-0004884 dated Feb. 26, 2021. 6 pages.

(Continued)

*Primary Examiner* — Malcolm Cribbs
(74) *Attorney, Agent, or Firm* — Schmeiser, Olsen & Watts LLP (57) ABSTRACT

A method for protecting the integrity of log data. The log data includes a sequence of log data elements associated with an operation of a first logic circuit. The method includes receiving, at a second logic circuit remote from the first logic circuit, a log data element of the sequence of log data elements. Based on the log data element and secret information unknown to the first logic circuit, a protected log data element is generated at the second logic circuit is provided.

12 Claims, 3 Drawing Sheets

(56) References Cited

U.S. PATENT DOCUMENTS

2018/0211035 A1  7/2018 Costa

FOREIGN PATENT DOCUMENTS

| | | |
|---|---|---|
| JP | 2014191659 A | 10/2014 |
| KR | 20030027896 A | 4/2003 |
| KR | 20180074967 A | 7/2018 |
| WO | 2008010006 A1 | 1/2008 |

OTHER PUBLICATIONS

Extended European Search Report for European Patent Application No. 19152043.6, dated Jul. 1, 2019. 7 pages.
Office Action in related Japanese Patent Application No. 2019-210454 dated Jun. 8, 2021. 4 pages.
Notice of Allowance in related European Patent Application No. 19152043.6 dated Jun. 14, 2021. 40 pages.

\* cited by examiner

PROTECTING INTEGRITY OF LOG DATA

CROSS-REFERENCE TO RELATED APPLICATIONS

This application claims priority to European Patent Application No. EP 19152043.6, having a filing date of Jan. 16, 2019, the entire contents of which are hereby incorporated by reference.

FIELD OF THE TECHNOLOGY

The following relates to protecting integrity of log data. In particular, the present application relates to a method for protecting an integrity of log data and a computer system implementing the method.

BACKGROUND

Log data, also called log messages or log entries, may be generated on a system and record the behavior of the system. The system may comprise for example a computer system or a network, for example a computer network. For detecting a malicious attack to the system, the system may be provided with an Intrusion Detection System (IDS). For example, a computer system may be provided with a host-based intrusion detection system (HIDS), and a network may be provided with a network intrusion detection system (NIDS). The IDS is a device or software application that monitors the network or system(s) for malicious activity or policy violations. Any malicious activity or violation may be reported either to an administrator or may be recorded in log data. In particular, in case of an attack or intrusion on the system, the log data may provide information on how the attack or intrusion was performed. An HIDS installed on a computer system may collect information about the operating state of the computer system in order to detect attacks with the help of this information.

Thus, an IDS is a system that actively monitors computer systems or computer networks and aims to detect attacks. In general, the IDS may use two different techniques for attack detection: a signature-based attack detection and an anomaly-based attack detection.

The signature-based attack detection uses attack patterns stored in a database (e.g. special log messages indicating a possible attack) to monitor the active system. Attacks are detected by the IDS by comparing attack signatures from its database with the active system behavior. If a stored signature matches the current system behavior, the IDS will conclude that an attack has occurred.

The anomaly-based attack detection attempts to detect attacks based on changes in system behavior. This means that the IDS learns/analyses the normal behavior of the system in a first step and compares the active behavior of the system with the previously learned normal behavior in a second step. If the current behavior deviates from the previously learned normal behavior, this can be interpreted as an anomaly and may be an indication of an attack on the system. The decision as to whether the system has deviated from normal behavior can be made using statistical methods or machine learning algorithms. In order to implement both types of IDS (HIDS, NIDS), log data of the current system behavior may first be created and then checked. Log data may record and document system behavior properties such as system calls, data accesses, user logins, failed calls, active network connections, etc.

Attackers who attack a computer system and gain administrator privileges over the system or kernel may change log data afterwards. When log data records evidence of the attack and is deleted by the attacker, it is impossible to prove the attacker's past and future activities on the system. For example, a Linux operating system is running on a processor. In addition, an HIDS may be installed on this operating system, which is either executed in user-space or anchored in the kernel and monitors/stores system calls from processes. The HIDS may be configured from the user space with corresponding privileges. If an attacker wishes to attack the system, the attacker may, for example, exploit a vulnerability of a legitimate functionality and then install and execute malicious software (malware) on the system. If the malware is installed on the system, the next step is to gain control over the kernel (e.g. by a kernel rootkit) and deactivate the HIDS. The malware may also gain full privileges in the user space area (i.e. root rights) and reconfigure the HIDS. Furthermore, the attacker may manipulate the log data generated by the HIDS and thus prevent the presence and activities of the malware from being logged. Finally, the malware may change past log data and thus delete its own traces of attack from the log data.

The problem of log manipulation may be addressed by several measures. For example, the kernel may provide special log protection, for example, access to log data may only be granted to the administrator, or certain critical functionalities may be completely blocked in order to limit the freedom of attackers on the systems. There are also file integrity monitoring approaches, but all these measures fail if attackers have administrator rights or completely control the kernel.

Furthermore, a Remote Attestation Service (RAS) in connection with a Trusted Platform Module (TPM) is known. The remote attestation service may be used to support a "Measured Boot" technique. According to the "Measured Boot" technique, each boot component, from firmware up to the boot start drivers, may form a cryptographic checksum of the next boot component. The checksums are stored in special Platform Configuration Registers (PCRs) of a Trusted Platform Module (TPM). The PCRs thus contain references to the state of the device (unmodified/modified) for each boot component. Afterwards it may be tracked if and which component(s) were changed/unchanged during loading. The PCR values can then be signed with a private key stored in the TPM. The signature and PCR values are then passed to another instance where they can be verified. This instance can thus make a statement about the integrity of the started software components of the system and then, for example, activate access to a service. However, this mechanism is not suitable for ensuring the integrity of log data or otherwise detecting malicious behavior on the device at runtime.

SUMMARY

Accordingly, there is a need for advanced techniques of protecting an integrity of log data. Specifically, there is a need for techniques which overcome or mitigate at least some of the above-identified drawbacks and limitations.

According to examples, a method for protecting an integrity of log data is provided. The log data comprises a sequence of log data elements, for example log messages or log entries, associated with an operation of a first logic circuit. The first logic circuit may comprise for example a processor on which an operating system, for example Linux or Unix, and applications are executed. According to the method, at a second logic circuit remote from the first logic circuit, a log data element of the sequence of log data elements is received. The second logic circuit may comprise a dedicated hardware, for example a field programmable gate array (FPGA) or an application specific integrated circuit (ASIC) coupled to the first logic circuit and configured to perform the herein described method steps. Based on the log data element and secret information the second logic circuit generates a protected log data element. The secret information is not known to the first logic circuit. Furthermore, the second logic circuit may be configured such that it is not possible for the first logic circuit to read out or otherwise access the secret information of the second logic circuit. The term "secret information" as it is used herein may relate for example to secret data used in the protection of logs. The secret information may comprise for example a key for encrypting the log data. Additionally or as an alternative, the secret information may be used to generate a signature for the log data, for example symmetrically using a keyed-hash function (HMAC), or asymmetrically.

Furthermore, according to an embodiment, the protected log data element is transmitted from the second logic circuit to the first logic circuit.

According to various examples, the protected log data element may also be transmitted directly from the second logic circuit to a remote device, for example a network device or a storage device, without being transmitted through the first logic circuit.

For example, an IDS may generate for each activity performed on the first logic circuit a corresponding log data element. These log data elements may log for example which system call a process has performed, which parameters were transferred together with the system call, or which file was opened or closed. Each log data element is transmitted to the second logic circuit and the second logic circuit protects the integrity of each log data element by encrypting each log data element using the secret information. As the secret information is not available at the first logic circuit, the attacker cannot decode or decrypt and modify the log data element. Therefore, any attempt to modify the log data element will be detectable afterwards based on the secret information.

According to various examples, the second logic circuit comprises a programmable cryptographic processing unit. For example, the second logic circuit may comprise a hardware-programmable processing unit, for example an FPGA. For example, a hash mechanism may be implemented using an FPGA-Microcontroller implemented on the FPGA. This Microcontroller may be programmed using a hardware description language, the logic (firmware) of the Microcontroller may comprise software.

Furthermore, the first logic circuit may comprise a central processing unit.

The first logic circuit and the second logic circuit may form a computer system.

For example, the first logic circuit and the second logic circuit may be implemented as an embedded system. The embedded system may comprise a central processing unit (CPU), acting as the first logic circuit, and an integrated, programmable logic, acting as the second logic circuit. Such an embedded system may be implemented using an FPGA System-on-a-Chip (FPGA-SoC) as the programmable logic. Such a FPGA-SoC may consist of a programmable, integrated circuit (FPGA area) and one or more processors (e.g. CPU cores), as well as other components, such as memory, buses, etc. FPGA-SoCs offer the possibility to execute an operating system (e.g. Unix or Linux) or bare-metal software on the processor and to let this processor communicate with the integrated FPGA logic and exchange commands/data via certain interfaces. The processor and the FPGA part may be integrated on a same chip. The FPGA may be configured with a digital circuit and thus implement functions directly in hardware. The digital circuit of the FPGA may be implemented using a hardware description language (e.g. VHDL, Verilog) and may either be programmed by a user, purchased as an open source project or purchased in the form of a finished hardware structure (e.g. IP core). In summary, the advantage of an FPGA-SoC is the possibility to outsource certain functionalities as an optimized hardware circuit, to connect these functionalities efficiently with the operating system without physically exposing the communication interfaces, and to operate functionalities outsourced in hardware logically independent of the operating system. Furthermore, FPGAs connected externally to a CPU—i.e., remote to the CPU—, or specially manufactured chips (e.g. ASICs) connected externally to a CPU may also be used to implement the first and second logic circuits. The independence of the hardware functionalities outsourced from the CPU enable to operate trustworthy hardware on the FPGA side, which securely stores cryptographic key material and performs cryptographic operations as intended, even with an operating system under attack.

According to an embodiment, the log data element is a current log data element following a preceding log data element of the sequence of log data elements. For generating the protected log data element, a current hash value is generated based on at least the log data of the current log data element and a previous hash value generated for the preceding log data element. The current hash value and the previous hash value are included in the protected log data element.

As each log data element includes information relating to the hash value of the preceding log data element, and each log data element may include information relating to its own hash, and each log data element may additionally be encrypted or may include a signature, each modification or deletion of the log data element is detectable. Therefore, an attacker cannot obscure or conceal previous traces which are logged in the log data.

Furthermore, the method may comprise generating, at the second logic circuit, an initial protected log data element based on a randomly generated session identifier. The initial protected log data element may act as a preceding log data element for the first log data element of the sequence of log data elements after system initialization.

The initial protected log data element may be transmitted from the second logic circuit to the first logic circuit.

Thus, an anchor for the sequence log data elements is provided. As the random session identifier may also be unknown to the first logic circuit, an attacker acting on the first logic circuit cannot manipulate the hash chain. Thus, the sequence of protected log data elements is protected.

In various examples, the protected log data element may be generated at the second logic circuit additionally based on a time information, for example a time information synchronized to global or local time or an unsynchronized time information (e.g. an unsynchronized logical clock).

Furthermore, the method may comprise incrementing a counter value upon receiving the current log data element. When generating the protected log data element, the current hash value is generated based on the counter value.

The counter value may also be unknown to the first logic circuit. Thus, the counter value may contribute to the advantage that any manipulation of a log element by an attacker acting on the first logic circuit may be detectable.

Furthermore, according to an embodiment, the log data elements may not be treated individually at the second logic circuit, but may be treated in blocks, groups or sets of log data elements. For example, a plurality of log data elements of the sequence of log data elements is received at the second logic circuit. The plurality of log data elements may include the above-mentioned single log data element. In this example, for generating the protected log data element, the protected log data element is generated based on the plurality of log data elements and the secret information unknown to the first logic circuit. By treating a plurality of log data elements within a single transaction, the round-trip times of the communication between the first and second logic circuits may be decreased.

According to various examples, an indication is transmitted from the second logic circuit to the first logic circuit. The indication may be transmitted together with the protected log data element or may be transmitted in a separate message. The indication instructs the first logic circuit to forward the protected log data element to a remote attestation service node which is located remote from the first logic circuit.

The indication may instruct the first logic circuit to forward the protected log data element to a remote device, for example a remote server, a remote network device, or a peripheral component, which may be arranged on a same hardware board as the first and second logic circuits.

In further examples, the second logic circuit may directly send the protected log data element to the remote attestation service or remote device without being forwarded by the first logic circuit.

The remote attestation service node may store the received protected log data elements and may protect them from being deleted by commands from the first logic circuit. Thus, modification or deletion of log data elements may not only be detectable, but the modification or deletion may be prohibited at all.

According to further embodiments, the method comprises synchronizing a time reference between the second logic circuit and the remote attestation service node. The protected log data element is generated at the second logic circuit additionally based on a time information defined in the time reference. The time information may comprise for example a time stamp including time and date, or time units with respect to a predefined reference point in time.

The remote attestation service node may provide a reliable time reference. By synchronizing the second logic circuit with the time reference of the remote attestation service node, a reliable time stamping of the protected log data elements may be enabled. As the protected log data elements cannot be modified by an attacker, a trace of attack is provided which includes the exact timing of the attack.

According to another embodiment of the method, the second logic circuit determines whether a response from the remote attestation service node indicating reception of the protected log data element at the remote attestation service node is received within a predefined time window. Upon determining that the response from the remote attestation service node is not received within the predefined time window, the second logic circuit may stop generating further protected log data elements.

In further embodiments, the second logic circuit determines whether a response from the remote attestation service node indicating reception of the protected log data element at the remote attestation service node is received within a predefined number of protected log data elements. Upon determining that the response from the remote attestation service node is not received within the predefined number of protected log data elements, the second logic circuit may stop generating further protected log data elements, and may perform further necessary steps, such as generating an alarm. This may be particularly useful in scenarios, where it is not feasible to establish a synchronized time.

Additionally, or as an alternative, upon determining that the response from the remote attestation service node is not received within the predefined time window or within the predefined number of protected log data elements, the second logic circuit may transmit an attack alarm indication. Thus, based on the missing response from the remote attestation service node, the second logic circuit may determine an attacked state of the first logic circuit and may consequently initiate corresponding measures like sending an alarm notification or stopping to process further log data elements which may be manipulated.

For generating the protected log data element, the second logic circuit may encrypt the log data of the log data element using for example a symmetric encryption scheme or an asymmetric encryption scheme and the secret information. Additionally or as an alternative, a signature, either symmetric or asymmetric, may be generated based on the secret information and included in the protected log data element.

According to another aspect of the present application, a computer system is provided. The computer system comprises a first logic circuit and a second logic circuit remote from first logic circuit. The computer system is configured to transmit, from the first logic circuit to the second logic circuit, a log data element of a sequence of log data elements associated with an operation of the first logic circuit. The computer system is furthermore configured to generate, at the second logic circuit, a protected log data element based on the log data element and secret information unknown to the first logic circuit, and to transmit the protected log data element from the second logic circuit to the first logic circuit.

The computer system may be configured to perform the above-described method or any one of the above described embodiments or examples. Therefore, the computer system also comprises the above-described advantages.

For example, the first logic circuit and the second logic circuit may be implemented on a system including a processor as the first logic circuit and a field programmable gate array (FPGA) outside or remote of the processor as the second logic circuit. The system may be implemented as a system-on-a-chip comprising a central processing unit (CPU) as the processor and an FPGA part. In other examples, the system may comprise a dedicated CPU-Chip and a dedicated FPPGA-Chip arranged on a same board, for example a printed circuit board (PCB), which connects these two chips.

Further, according to the present application, a computer program product comprising program code (non-transitory computer readable storage medium having instructions, which when executed by a processor, perform actions) is provided. The program code may be executed by a computer system comprising a first logic circuit and a second logic circuit remote from the first logic circuit. Executing the program code causes the computer system to perform a method for protecting an integrity of log data. The log data comprises a sequence of log data elements associated with an operation of the first logic circuit. The method comprises receiving, at the second logic circuit, a log data element of the sequence of log data elements, and generating, at the second logic circuit, a protected log data element based on the log data element and secret information unknown to the first logic circuit.

It is to be understood that the features mentioned above and those yet to be explained below may be used not only in the respective combinations indicated, but also in other combinations or in isolation without departing from the scope of the embodiment.

BRIEF DESCRIPTION

Some of the embodiments will be described in detail, with reference to the following figures, wherein the designations denote like members, wherein.

DETAILED DESCRIPTION

In the following, embodiments of the invention will be described in detail with reference to the accompanying drawings. It is to be understood that the following description of embodiments is not to be taken in a limiting sense. The scope of the embodiments of the invention is not intended to be limited by the embodiments described hereinafter or by the drawings, which are taken to be illustrative only. Same reference signs in the various drawings refer to similar or identical components.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

As described in the following, according to various examples, log messages are cryptographically secured against manipulation by a trustworthy hardware security anchor. The trustworthy hardware security anchor may be implemented in dedicated hardware, for example an FPGA or an ASIC.

Figure 1:
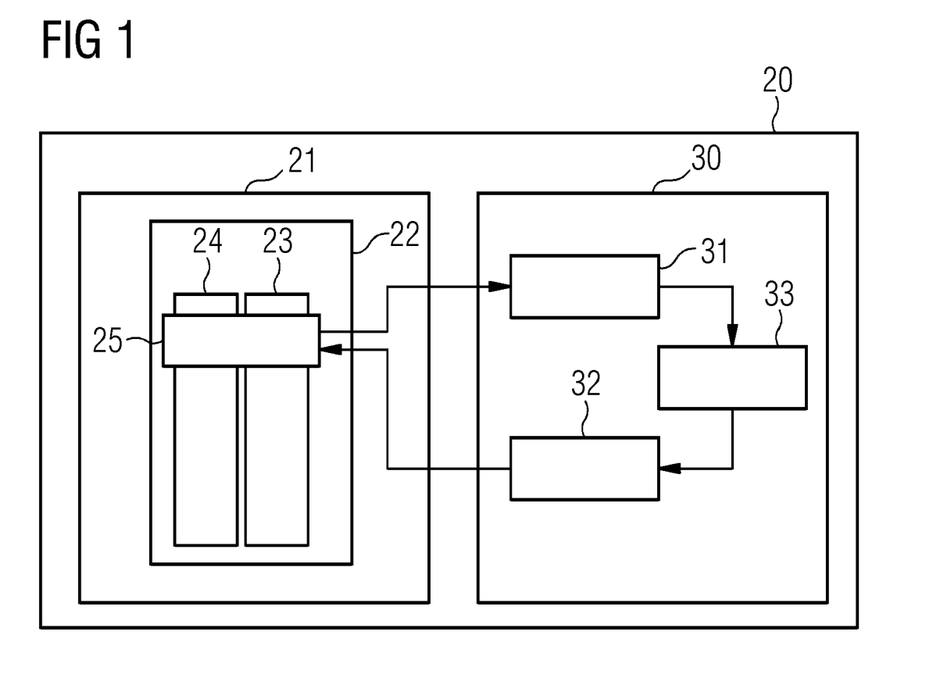
FIG. 1 schematically illustrates an ensemble of components of a computer system according to various examples.

FIG. 1 shows an example of a computer system 20, for example an embedded system implemented on an FPGA-SoC (Field Programmable Gate Array-System-on-a-Chip).

The computer system 20 comprises a first logic circuit 21, comprising for example a central processing unit (CPU), which executes software, for example an operating system 22. The operating system 22 may comprise for example a Linux or a Unix system. The operating system 22 may comprise a kernel 23 and a user space 24 for executing applications. Furthermore, the central processing unit may execute a host-based intrusion detection system (HIDS) 25. In the following, the first logic circuit 21 will also be called processor area 21. The processor area 21 may comprise further components, for example memory and input/output interfaces.

The computer system 20 comprises furthermore a second logic circuit 30. The second logic circuit 30 may be realized by the FPGA. Therefore, in the following the second logic circuit 30 will also be called FPGA area 30. The FPGA area 30 comprises an input module 31, an output module 32 and a hardware security module (HSM) 33.

The HIDS 25 may generate for each activity of processes in the user space 24 and/or the kernel 23 corresponding log messages, which will be called in the following log data elements. These log data elements may log for example a process of making a system call including corresponding parameters, or a process of opening a file, or a process of inputting and outputting data.

Each log data element generated by the HIDS 25 is communicated via the input module 31 to the HSM 33. The HSM 33 protects the log data element by generating a protected log data element based on the log data element and secret information which is not known to the first logic circuit 21. For example, the HSM 33 may use a Keyed-Hash Message Authentication Code (HMAC) technique to determine a HMAC value for the data of the log data element. The protected log data element is sent back via the output module 32 to the first logic circuit 21 and may be stored in a memory of the first log circuit 21. To avoid that an attacker obscures the trace of attack, the protected log data element may be configured such that it is not possible for the attacker to cancel a protected log data element without leaving an indication that the protected log data element has been canceled. Additionally, or as an alternative, the protected log data element may be stored in a memory to which the attacker has no access. As a result, the protected log data elements are safe and protected from the attacker.

The protected log data element may be stored on the computer system 20, in particular in the processor area 21. In this case, the attacker may have access to the memory where the protected log data elements are stored, and it may be possible for the attacker to cancel or remove one or more of the protected log data elements.

Additionally or as an alternative, the protected log data elements may also be transmitted from the HSM 33 to a remote device, for example a network device or a storage device, without being transmitted to the first logic circuit 21.

For assuring that a removal of one or more protected log data elements is detectable, hash chains may be used to prove integrity of a sequence of log data elements. For example, in a hash chain a hash value of the present log data element may be combined with a hash value of a previous log data element. In particular, the previous log data element may be the directly preceding log data element. For example, when using HMAC techniques, an HMAC value for the present log data element may be calculated including the data of the present log data element and the HMAC value of the previous log data element, in particular the directly preceding log data element.

Figure 2:
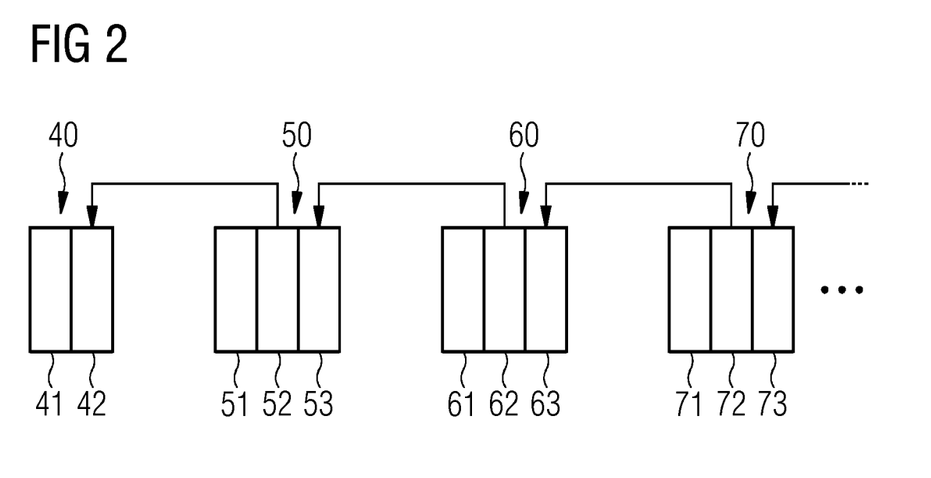
FIG. 2 schematically illustrates a plurality of protected log data elements according to various examples.

FIG. 2 shows this principle. An initial protected log data element 40 is generated at the second logic circuit 30 comprising a data field 41 and a HMAC value 42. The data field 41 may comprise for example a session identifier which is randomly generated by the second logic circuit 30. The HMAC value 42 is calculated based on the data field 41. Thus, the initial protected log data element 40 represents an anchor for following protected log data elements 50, 60 and 70. The initial protected log data element 40 may be transmitted via the output module 32 to the first logic circuit 21 for being stored in a log memory of the first logic circuit 21.

When the second logic circuit 30 receives a log data element, the HSM 33 creates a corresponding protected log data element 50 by appending the HMAC value 42 as previous HMAC value 52 to the log data 51 of the received log data element. Then, the HSM 33 calculates a HMAC value 53 based on the log data 51 and the previous HMAC value 52. The calculated HMAC value 53 is additionally appended to the log data 51 and the previous HMAC value 52. Additionally, the whole protected log data element 50 or parts thereof may be encrypted utilizing for example a symmetric encryption scheme or an asymmetric encryption scheme. Finally, the created protected log data element 50 may be transmitted to the first logic circuit 21.

When the second logic circuit 30 receives a further log data element, the HSM 33 creates a corresponding further protected log data element 60 by appending the HMAC value 53 as previous HMAC value 62 to the log data 61 of the received further log data element. Then, the HSM 33 calculates a HMAC value 63 based on the log data 61 and the previous HMAC value 62. The calculated HMAC value 63 is appended to the log data 61 and the previous HMAC value 62. Additionally, the whole protected log data element 60 or parts thereof may be encrypted utilizing for example a symmetric encryption scheme or an asymmetric encryption scheme. The thus created further protected log data element 60 may be transmitted to the first logic circuit 21.

For each received further log data element, the HSM 33 creates the corresponding protected log data element, for example the protected log data element 70 comprising the log data 71, the previous HMAC value 72 and the present HMAC value 73.

The integrity of the sequence of protected log data elements 50, 60, 70 may be verified based on the combination of the hash values. In case an attacker wants to modify or cancel a specific protected log data element, the attacker has to modify all hash values of the following protected log data elements. However, this is impossible for the attacker as the necessary cryptographic keys are only available in the HSM 33, but not in the first logic circuit 21.

The input module 31 and the output module 32 may each be realized as First In First Out (FIFO) modules.

For example, the input module 31 and the output module 32 may be realized as ring buffers in the FPGA area and may be connected to the kernel 23 and HIDS 25 via a specific memory area. A log data element generated is stored by the HIDS 25 in the ring buffer and this log data element is returned in the ring buffer as a protected log data element from the HSM 33.

When generating the initial protected log data element 40, a counter value may additionally be initialized. Upon receiving a new log data element, the HSM 33 may increment the counter value and may include the counter value when calculating the hash value HMAC.

To sum up, in a first step, for example after a reset of the FPGA-SoC 20, the hash chain is initialized. This initialization comprises transmitting the first protected log data element 40 as an anchor for the hash chain. In operation of the FPGA-SOC 20, communication between the processor area 21 and the FPGA area 30 comprises a request-response procedure initiated by the HIDS 25 transmitting the new log data element. After receiving a request at the HSM 33, the HSM 33 generates a new protected log data element including the log data of the received log data element, optionally the session identifier and the incremented counter value, and the hash value of the previous protected log data element as well as the hash value calculated based on the previously mentioned data (log data, session identifier optionally, counter value optionally and previous hash value).

The HIDS 25 receives the protected log data element 40, 50, 60, 70 and stores the received protected log data element as a new entry of the hash chain. The HSM 33 may store the session identifier, the hash value of the latest protected log data element as well as the incremented counter value. As the HSM 33 is physically separated from the operating system 22, an attacker cannot access the secret information, for example cryptographic keys, used for determining the hash key, and the attacker cannot access the protocol parameters like the session identifier, counter value and previous hash value, such that the attacker cannot modify the protected log data element and the hash chain is protected.

For improving performance and reducing communication between the HIDS 25 and the HSM 33, the log data may be excluded from the protected log data element as the log data is already present in the HIDS 25. Thus, after receiving a log data element at the HSM 33, the HSM 33 generates a new protected log data element including the hash value of the previous protected log data element as well as the hash value calculated based on the log data, session identifier optionally, incremented counter value optionally and/or time optionally and previous hash value. The new protected log data element may be transmitted to the HIDS 25 (not including the log data), and the HIDS 25 may assign the received protected log data element to the corresponding log data.

When the protected log data elements are analyzed by an administrator or a tool for analyzing log data, it is easy to prove whether the log data is complete, and modifications may be easily recognized.

Figure 3:
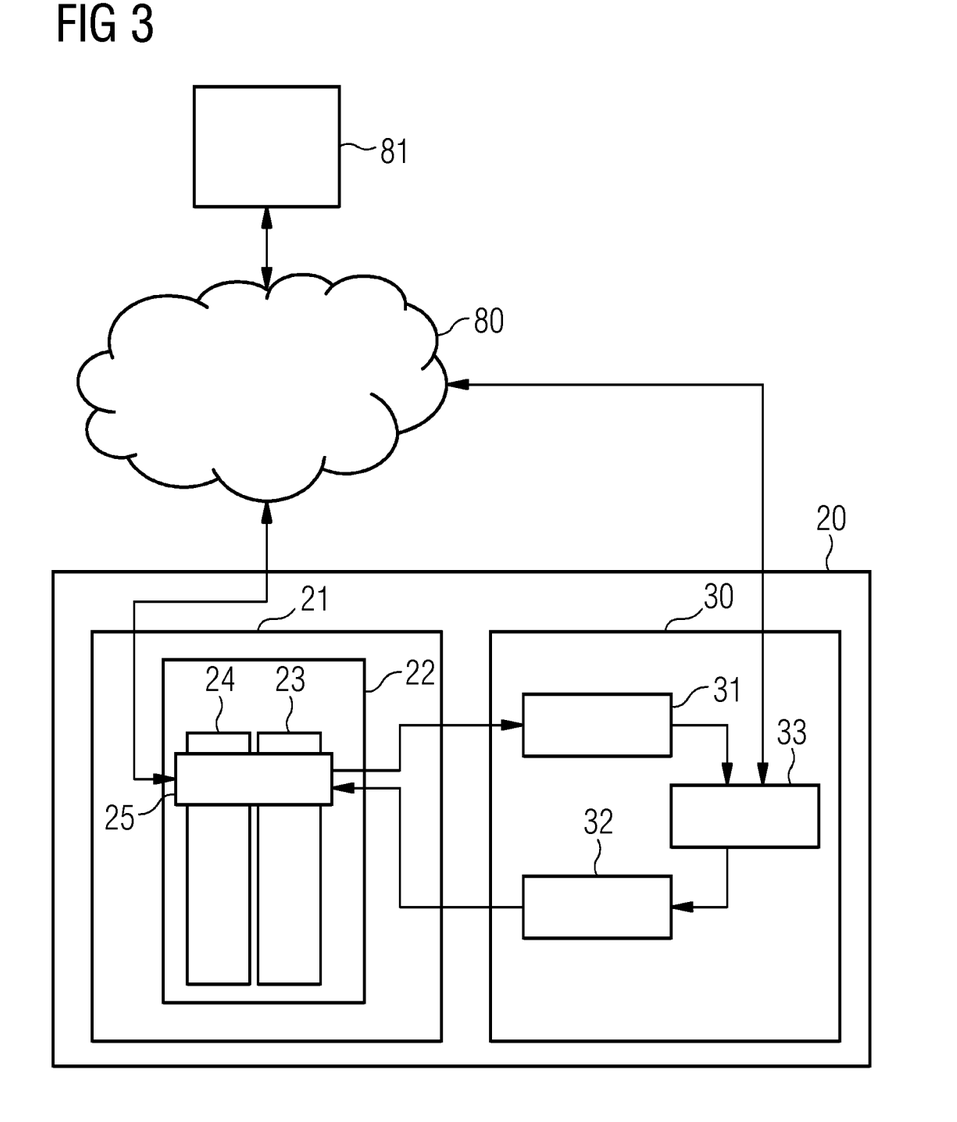
FIG. 3 schematically illustrates an ensemble of components of a computer system according to various examples.

FIG. 3 shows a further example of a computer system 20, which may also be realized as an embedded system implemented on an FPGA-SoC. The computer system 20 shown in FIG. 3 comprises essentially the same components 21 to 25 and 30 to 33 as the computer system 20 shown in FIG. 1, and therefore the description of these components will not be repeated.

FIG. 3 shows additionally a data communication network 80, for example the Internet, and a remote attestation service node 81. The data communication network 80 enables a data communication between the remote attestation service node 81 and the HIDS 25.

Each log data element generated by the HIDS 25 is communicated via the input module 31 to the HSM 33. The HSM 33 generates a corresponding protected log data element based on the received log data element and secret information which is not known to the first logic circuit 21. The HSM 33 may use the keyed-Hash Message Authentication Code (HMAC) on the received log data to determine an HMAC value for generating the protected log data element. The protected log data element is sent via the output module 32 to the HIDS 25. Furthermore, the HSM 33 may transmit an indication to the HIDS 25 indicating that the protected log data element is to be forwarded to the remote attestation service node 81. As an alternative, the HIDS may be configured such that it forwards the received protected log data element to the remote attestation service node 81 without a dedicated instruction from the HSM 33. The HIDS 25 forwards this protected log data element via the data communication network 80 to the remote attestation service node 81.

The HIDS 25 may transmit blocks of log data elements comprising for example a predefined number of log data elements, for example 100 log data elements, via the input module 31 to the HSM 33. The HSM 33 may generate corresponding blocks of protected log data elements based on the received block of log data elements and the secret information. Transmitting blocks of log data elements instead of single log data elements may contribute to speed up the communication due to reduced round trip times. However, protecting blocks of log data elements or single log data elements may be performed in the same way as described above in connection with FIGS. 1 and 2.

The remote attestation service node 81 stores the received protected log data element. The remote attestation service node 81 only allows for the HSM 33 to add, delete or modify data. To accomplish this, the HSM and a remote attestation service (RAS) provided on the remote attestation service node 81 may negotiate secret information and protocol parameters during an initialization, a so-called bootstrapping, such that the HSM 33 and the RAS may authenticate each other. The secret information may comprise encryption keys, for example for a symmetric or an asymmetric encryption. During initialization, also a time reference between the second logic circuit 30 and the remote attestation service node 81 may be synchronized. After transmitting a protected log data element via the HIDS 25 to the remote attestation service node 81, the HSM 33 may wait for a confirmation from the RAS. When the confirmation from the RAS is not received at the HSM 33 within a predefined time window, the HSM may assume that an attacker manipulates the communication between the HSM 33 and the RAS, and the HSM 33 may stop generating further protected log data elements. Additionally, the HSM 33 may transmit an attack alarm indication to an administrator. For protecting the communication between the HSM 33 and the RAS from replay attacks, cryptographic nonce techniques may be utilized.

The above-mentioned bootstrapping may comprise for example a Time Efficient Stream Loss-tolerant Authentication (TESLA) method for achieving properties of asymmetric cryptography by using symmetric cryptography. For example, according to TESLA methods, a root key and cryptographic parameters are exchanged in a first step. These parameters are used to transmit encrypted log data elements to the RAS and to receive a response, whether the encrypted log data elements were received untouched or whether an anomaly was detected. As an alternative, cryptographic parameters may be negotiated based on a certificate-based authentication.

As the log data is stored in the remote attestation service node 81, an attacker acting on the first logic circuit 21 cannot obscure the traces of the attack. The RAS may use the log data for recognizing an attack, for example by using machine learning algorithms.

As mentioned above, the input module 31 may store a predefined number of log data elements, for example a block of 100 log data elements, and the HSM 33 may sign all these log data elements once the predefined number is reached. The predefined number may be higher or lower than 100, for example 50 or several hundreds, in particular each log data element may be treated separately. A symmetric encryption may be used to realize a high performance of protecting the integrity of the log data.

Instead of storing the protected log data elements in the remote attestation service node 81, the protected log data elements may be stored on an external storage medium, for example an SD card or an external write only hard disk.

Figure 4:
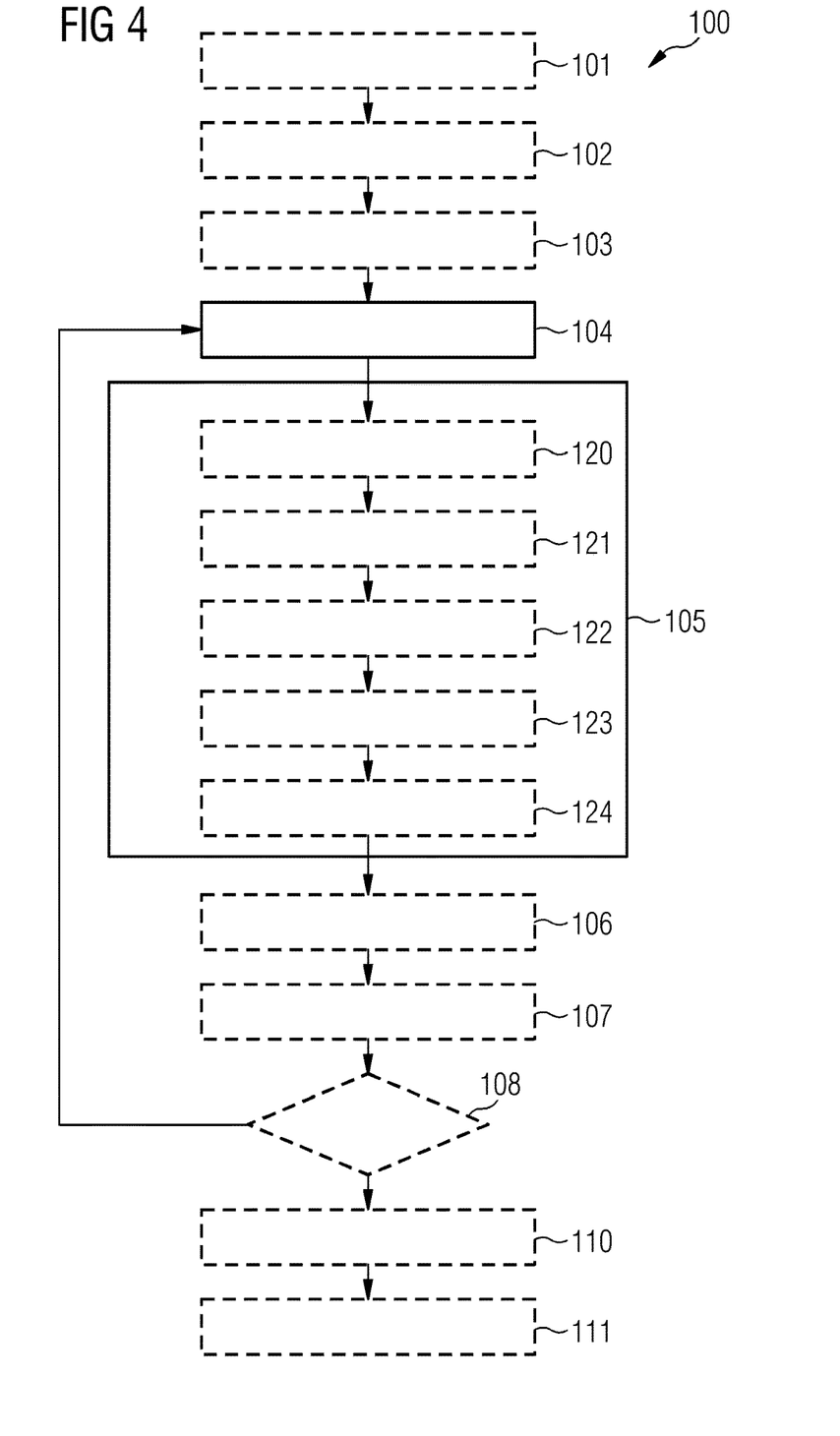
FIG. 4 is a process flow chart illustrating method steps of a method for protecting an integrity of log data according to various examples.

FIG. 4 summarizes steps of a method 100 for protecting the integrity of log data. The method 100 comprises method steps 101 to 124. Optional method steps are indicated by dashed boxes.

Optional steps 101 to 103 relate to an initialization phase of the computer system 20. These steps are optional, as such initialization may be realized in other ways, for example by implementing corresponding default parameters and synchronizing to a global clock. In step 101 a time reference is synchronized between the second logic circuit 30 and the remote attestation service node 81. In step 102, at the second logic circuit 30, an initial protected log data element 40 is generated based on a randomly generated session identifier. The initial protected log data element 40 acts as the preceding log data element for the hash chain of the protected log data elements 50, 60, 70. The initial protected log data element 40 may be transmitted in step 103 from the second logic circuit 30 to the first logic circuit 21. Additionally, a counter for counting the log data elements received at the HSM 33 may be initialized.

In step 104, a log data element is generated in the first logic circuit 21 and transmitted by the HIDS 25 via the input module 31 to the HSM 33 of the second logic circuit 30. As mentioned above, the log data elements may be transmitted from the HIDS 25 to the HSM 33 in blocks, for example in blocks of 100 log data elements. Upon receiving the log data element or a block of log data elements, the HSM 33 may increment the counter.

In step 105, the HSM 33 generates a protected log data element 50, 60, 70 based on the received log data element and secret information which is unknown to the first logic circuit 21. The hashing may be performed using a key-based hashing, for example a Keyed-Hash Message Authentication Code (HMAC), or using a hashing without key. The secret information may comprise keys, parameters and/or algorithm identifiers of the hashing algorithm. For example, the HSM 33 may generate in step 120 a current hash value based on the log data of the received log data element and based on a previous hash value generated for the preceding log data element. The current hash value as well as the previous hash value may be included in the protected log data element 50, 60, 70 in step 121. Furthermore, in step 122, the current hash value may be generated additionally based on the counter value. In step 123 the protected log data element may be generated additionally based on a timestamp defined in the time reference, for example by including the timestamp in the protected log data element 50, 60, 70. Additionally, in step 124, the log data included in the protected log data element 50, 60, 70 may be encrypted using a symmetric encryption scheme or using an asymmetric encryption scheme.

In step 106 the thus generated protected log data element 50, 60, 70 is transmitted from the second logic circuit 30 to the first logic circuit 21. Optionally, an indication may be transmitted to the first logic circuit 21 which instructs the first logic circuit 21 to forward the protected log data element 50, 60, 70 to the remote attestation service node 81. Upon receiving this indication, the HIDS 25 may forward the protected log data element 50, 60, 70 to the remote attestation service node 81.

In step 107, the HSM 33 may determine, whether a response from the remote attestation service node 81 is received within a predefined time window, for example within a few hundred milliseconds. The response may indicate that the remote attestation service node 81 has received the protected log data element 50, 60, 70. In step 108, upon determining that the response was indeed received within the predetermined time window, the HSM 33 may continue at step 104. However, if the response was not received within the predetermined time window, the HSM 33 may stop generating further protected log data elements in step 110 and may transmit an attack alarm indication in step 111.

The use of the HSM 33 in the FPGA area 30 allows log messages to be cryptographically secured without an attacker having a chance to manipulate them. This solves the following problem: after attacking a system, attackers can no longer conceal past and present activities and may therefore be recognized by the administrator, HIDS or an instance in a RAS procedure.

This may solve a major problem of IoT devices or network Industrial Control Systems (ICS) (generally Embedded Systems), which are more and more exposed to attacks. These attacks may be so sophisticated that no traces are visible after or during the attack. The reason for this is that the attackers reconfigure security mechanisms on the respective system in order to conceal their own traces. The above described methods and systems secure the integrity of log messages and makes it substantially more difficult for attackers to conceal or blur their presence or the attack trace. System administrators may always see whether an attack has occurred, and which vulnerability has been exploited. With the method and system described in connection with FIG. 3, a system administrator can be guaranteed with a higher level of certainty to see whether and how an attack occurred, because the protected log data elements cannot be deleted easily without detection. The method and system described in connection with FIG. 1 may provide a proof that an attack has taken place. However, since the attacker can delete critical log messages under certain circumstances, it is possible that the attack could not be traced.

Previously, log messages were created and stored on the system, or intermittently forwarded to a central instance where the analysis and storage was performed. The fact that attackers can manipulate past and future log messages after attacking the system in order to conceal their presence is a major problem. By utilizing the above described methods and systems, the integrity of log messages can be secured. Thus an attacker, even if the attacker completely controls the operating system, cannot easily conceal the attack traces. Consequently, if for example an embedded system has been attacked, the probability that this can be proven is significantly increased, as the authenticity of log messages can always be trusted.

Although the embodiment of the invention has been shown and described with respect to certain preferred embodiments, equivalents and modifications will occur to others skilled in the art upon the reading and understanding of the specification. The present embodiment of the invention includes all such equivalents and modifications and is limited only by the scope of the appended claims.

What is claimed:

1. A method for protecting an integrity of log data, the log data comprising a sequence of log data elements associated with an operation of a first logic circuit, the method comprising:
   receiving, at a second logic circuit remote from the first logic circuit, a log data element of the sequence of log data elements;
   generating, at the second logic circuit, a protected log data element based on the log data element and secret information unknown to the first logic circuit;
   transmitting an indication to the first logic circuit, the indication instructing the first logic circuit to forward the protected log data element to an attestation service node remote from the first logic circuit;
   synchronizing a time reference between the second logic circuit and the remote attestation service node; and
   generating, at the second logic circuit, the protected log data element additionally based on a time information defined in the time reference.

2. The method of claim 1, wherein the second logic circuit comprises a programmable cryptographic processing unit.

3. The method of claim 1, wherein the first logic circuit comprises a central processing unit, and the first logic circuit and the second logic circuit form a computer system.

4. The method of claim 1, wherein the log data element is a current log data element following a preceding log data element of the sequence of log data elements, further wherein generating the protected log data element comprises:
   generating a current hash value based on at least the log data of the current log data element and a previous hash value generated for the preceding log data element; and
   including the current hash value and the previous hash value in the protected log data element.

5. The method of claim 4, further comprising:
   generating an initial protected log data element based on a randomly generated session identifier, the initial protected log data element acting as a preceding log data element for the first log data element of the sequence of log data elements after system initialization.

6. The method of claim 4, further comprising:
   incrementing a counter value upon receiving the current log data element, wherein generating the protected log data element comprises generating the current hash value further based on the counter value.

7. The method of claim 1, comprising:
   receiving a plurality of log data elements of the sequence of log data elements, the plurality of log data elements including the log data element,
   wherein generating the protected log data element comprises:
   generating the protected log data element based on the plurality of log data elements and the secret information unknown to the first logic circuit.

8. The method of claim 1, comprising:
   determining, whether a response from the remote attestation service node indicating reception of the protected log data element at the remote attestation service node is received within a predefined time window, and
   upon determining that the response from the remote attestation service node is not received within the predefined time window, performing at least one of:
   stop generating further protected log data elements,
   transmitting an attack alarm indication.

9. The method of claim 1, wherein generating the protected log data element comprises at least one of:
   using a symmetric encryption scheme based on the secret information, and
   using an asymmetric encryption scheme based on the secret information.

10. A computer system comprising:
    a first logic circuit; and
    a second logic circuit remote from first logic circuit;
    wherein the computer system is configured to:
    transmit from the first logic circuit to the second logic circuit, a log data element of a sequence of log data elements associated with an operation of the first logic circuit;

generate, at the second logic circuit, a protected log data element based on the log data element and secret information unknown to the first logic circuit;

transmit an indication to the first logic circuit, the indication instructing the first logic circuit to forward the protected log data element to an attestation service node remote from the first logic circuit;

synchronize a time reference between the second logic circuit and the remote attestation service node; and generate, at the second logic circuit, the protected log data element additionally based on a time information defined in the time reference.

11. The system of claim 10, wherein the first logic circuit and the second logic circuit are implemented on a system including a processor as the first logic circuit and a field programmable gate array outside the processor as the second logic circuit.

12. A computer program product, comprising a computer readable hardware storage device having computer readable program code stored therein, said program code executable by a processor of a computer system to implement a method for protecting an integrity of log data of claim 1.

* * * * *